United States Patent
Schick et al.

(10) Patent No.: US 11,593,564 B2
(45) Date of Patent: Feb. 28, 2023

(54) SYSTEMS AND METHODS FOR EXTRACTING PATENT DOCUMENT TEMPLATES FROM A PATENT CORPUS

(71) Applicant: Specifio, Inc., Ojai, CA (US)

(72) Inventors: Ian C. Schick, Ojai, CA (US); Kevin Knight, Marina del Rey, CA (US)

(73) Assignee: Specifio, Inc., Ojai, CA (US)

( * ) Notice: Subject to any disclaimer, the term of this patent is extended or adjusted under 35 U.S.C. 154(b) by 320 days.

(21) Appl. No.: 16/901,677

(22) Filed: Jun. 15, 2020

(65) Prior Publication Data

US 2020/0311351 A1    Oct. 1, 2020

Related U.S. Application Data

(63) Continuation-in-part of application No. 16/814,335, filed on Mar. 10, 2020, now Pat. No. 11,188,664, and
(Continued)

(51) Int. Cl.
| | |
|---|---|
| *G06F 40/186* | (2020.01) |
| *G06F 40/194* | (2020.01) |
| *G06F 40/30* | (2020.01) |
| *G06Q 10/10* | (2023.01) |
| *G06Q 50/18* | (2012.01) |
| *G06F 40/137* | (2020.01) |
| *G06F 40/284* | (2020.01) |

(Continued)

(52) U.S. Cl.
CPC ............ *G06F 40/30* (2020.01); *G06F 40/137* (2020.01); *G06F 40/284* (2020.01); *G06F 40/56* (2020.01); *G06Q 10/10* (2013.01); *G06Q 50/184* (2013.01); *G06N 20/00* (2019.01)

(58) Field of Classification Search
CPC .... G06F 40/137; G06F 40/186; G06F 40/194; G06F 40/284; G06F 40/30; G06Q 50/18; G06Q 50/184
USPC ........... 704/1, 9, 10; 705/311, 310; 707/711, 707/737, 747; 706/12
See application file for complete search history.

(56) References Cited

U.S. PATENT DOCUMENTS

| | | | | |
|---|---|---|---|---|
| 5,774,833 A | * | 6/1998 | Newman | G06F 40/30 704/9 |
| 5,799,325 A | * | 8/1998 | Rivette | G06F 16/94 715/209 |

(Continued)

OTHER PUBLICATIONS

Jhamtani, H., Gangal, V., Hovy, E., & Nyberg, E. (2017). Shakespearizing modern language using copy-enriched sequence-to-sequence models. arXiv preprint arXiv:1707.01161) (Year: 2017) 10 pages.

(Continued)

*Primary Examiner* — Martin Lerner
(74) *Attorney, Agent, or Firm* — Esplin & Associates, PC

(57) ABSTRACT

Systems, methods, and storage media for extracting patent document templates from a patent corpus are disclosed. Exemplary implementations may: obtain a patent corpus; receive one or more parameters; determine one or more subsets of the patent corpus by filtering the patent corpus based on the one or more parameters; identify one or more document clusters within individual ones of the one or more subsets of the patent corpus; obtain a patent document template corresponding to the first document cluster; and/or perform other operations.

19 Claims, 4 Drawing Sheets

Related U.S. Application Data a continuation-in-part of application No. 16/739,655, filed on Jan. 10, 2020, which is a continuation of application No. 16/510,074, filed on Jul. 12, 2019, now Pat. No. 10,572,600, application No. 16/901,677, which is a continuation-in-part of application No. 16/025,720, filed on Jul. 2, 2018, now abandoned, and a continuation-in-part of application No. 16/025,687, filed on Jul. 2, 2018, now Pat. No. 10,747,953, and a continuation-in-part of application No. 15/994,756, filed on May 31, 2018, now Pat. No. 10,713,443, said application No. 16/814,335 is a continuation of application No. 15/936,239, filed on Mar. 26, 2018, now Pat. No. 10,621,371, said application No. 16/510,074 is a continuation of application No. 15/892,679, filed on Feb. 9, 2018, now Pat. No. 10,417,341.

(60) Provisional application No. 62/590,274, filed on Nov. 23, 2017, provisional application No. 62/564,210, filed on Sep. 27, 2017, provisional application No. 62/561,876, filed on Sep. 22, 2017, provisional application No. 62/553,096, filed on Aug. 31, 2017, provisional application No. 62/546,743, filed on Aug. 17, 2017, provisional application No. 62/539,014, filed on Jul. 31, 2017, provisional application No. 62/534,793, filed on Jul. 20, 2017, provisional application No. 62/528,907, filed on Jul. 5, 2017, provisional application No. 62/526,316, filed on Jun. 28, 2017, provisional application No. 62/526,314, filed on Jun. 28, 2017, provisional application No. 62/523,262, filed on Jun. 22, 2017, provisional application No. 62/523,257, filed on Jun. 22, 2017, provisional application No. 62/523,258, filed on Jun. 22, 2017, provisional application No. 62/523,260, filed on Jun. 22, 2017, provisional application No. 62/519,852, filed on Jun. 14, 2017, provisional application No. 62/519,847, filed on Jun. 14, 2017, provisional application No. 62/519,850, filed on Jun. 14, 2017, provisional application No. 62/516,640, filed on Jun. 7, 2017, provisional application No. 62/515,096, filed on Jun. 5, 2017, provisional application No. 62/479,136, filed on Mar. 30, 2017, provisional application No. 62/459,199, filed on Feb. 15, 2017, provisional application No. 62/459,235, filed on Feb. 15, 2017, provisional application No. 62/459,208, filed on Feb. 15, 2017, provisional application No. 62/459,357, filed on Feb. 15, 2017, provisional application No. 62/459,246, filed on Feb. 15, 2017.

(51) Int. Cl.
*G06F 40/56* (2020.01)
*G06N 20/00* (2019.01)

(56) References Cited

U.S. PATENT DOCUMENTS

| | | | |
|---|---|---|---|
| 6,014,663 A | 1/2000 | Rivette | |
| 6,049,811 A | 4/2000 | Petruzzi | |
| 6,434,580 B1 | 8/2002 | Takano | |
| 7,890,851 B1* | 2/2011 | Milton, Jr. | G06Q 10/10 |
| | | | 715/224 |
| 8,041,739 B2 | 10/2011 | Glasgow | |
| 8,843,821 B2 | 9/2014 | Tran | |
| 9,195,647 B1 | 11/2015 | Zhang | |
| 9,454,731 B1* | 9/2016 | Lee | G06F 40/169 |
| 9,542,360 B2 | 1/2017 | Tran | |
| 9,547,640 B2 | 1/2017 | Bostick | |
| 9,600,566 B2 | 3/2017 | Ganti | |
| 9,607,058 B1* | 3/2017 | Gupta | G06F 16/93 |
| 9,734,137 B2 | 8/2017 | Burchett | |
| 9,836,805 B2 | 12/2017 | Rau | |
| 9,906,515 B1 | 2/2018 | Tillman | |
| 9,946,895 B1 | 4/2018 | Kruse | |
| 9,990,351 B2 | 6/2018 | Tran | |
| 10,073,890 B1* | 9/2018 | Khamis | G06Q 50/18 |
| 10,242,066 B2 | 3/2019 | Lundberg | |
| 10,417,341 B2 | 9/2019 | Schick | |
| 10,469,425 B1 | 11/2019 | Conley | |
| 10,572,600 B2 | 2/2020 | Schick | |
| 10,621,371 B1* | 4/2020 | Schick | G06F 40/166 |
| 10,713,443 B1 | 7/2020 | Knight | |
| 10,747,953 B1 | 8/2020 | Priyadarshi | |
| 10,839,149 B2* | 11/2020 | Gururajan | G06F 40/186 |
| 11,023,662 B2 | 6/2021 | Schick | |
| 11,341,323 B1* | 5/2022 | Donahue, III | G06Q 50/184 |
| 2001/0049707 A1 | 12/2001 | Tran | |
| 2003/0065637 A1 | 4/2003 | Glasgow | |
| 2005/0144177 A1 | 6/2005 | Hodes | |
| 2005/0210042 A1 | 9/2005 | Goedken | |
| 2005/0261891 A1 | 11/2005 | Chan | |
| 2005/0278623 A1* | 12/2005 | Dehlinger | G06F 40/174 |
| | | | 715/243 |
| 2006/0190807 A1 | 8/2006 | Tran | |
| 2007/0174039 A1 | 7/2007 | Lin | |
| 2007/0276796 A1* | 11/2007 | Sampson | G06F 16/358 |
| 2008/0147656 A1 | 6/2008 | Kahn | |
| 2008/0281860 A1 | 11/2008 | Elias | |
| 2008/0313528 A1 | 12/2008 | Chang | |
| 2009/0077092 A1 | 3/2009 | Knight | |
| 2010/0257089 A1 | 10/2010 | Johnson | |
| 2010/0325716 A1 | 12/2010 | Hong | |
| 2011/0184727 A1 | 7/2011 | Connor | |
| 2011/0246438 A1 | 10/2011 | Sathish | |
| 2011/0295895 A1 | 12/2011 | Musgrove | |
| 2011/0307499 A1* | 12/2011 | Elias | G06F 16/358 |
| | | | 707/750 |
| 2012/0101803 A1 | 4/2012 | Popov | |
| 2012/0101804 A1 | 4/2012 | Roth | |
| 2012/0226683 A1* | 9/2012 | Pogodin | G06F 16/24573 |
| | | | 707/723 |
| 2012/0251016 A1 | 10/2012 | Lyons | |
| 2012/0296835 A1 | 11/2012 | Khan | |
| 2013/0282599 A1 | 10/2013 | Kang | |
| 2014/0108273 A1* | 4/2014 | Lundberg | G06Q 50/184 |
| | | | 705/310 |
| 2014/0180934 A1 | 6/2014 | Surdeanu | |
| 2014/0249801 A1 | 9/2014 | Jackson | |
| 2015/0106079 A1 | 4/2015 | Bostick | |
| 2015/0261745 A1* | 9/2015 | Song | G06F 40/56 |
| | | | 704/9 |
| 2015/0278810 A1 | 10/2015 | Ramatchandirane | |
| 2015/0310000 A1* | 10/2015 | Schijvenaars | G06F 16/382 |
| | | | 707/738 |
| 2016/0048936 A1 | 2/2016 | Perkowski | |
| 2016/0232246 A1 | 8/2016 | Rau | |
| 2016/0350886 A1 | 12/2016 | Jessen | |
| 2017/0039174 A1 | 2/2017 | Strope | |
| 2017/0124612 A1 | 5/2017 | Musgrove | |
| 2017/0185591 A1 | 6/2017 | Tetreault | |
| 2017/0185921 A1 | 6/2017 | Zhang | |
| 2017/0220544 A1* | 8/2017 | Masson | G06F 40/186 |
| 2017/0256010 A1 | 9/2017 | Mohindru | |
| 2018/0018564 A1* | 1/2018 | Erenrich | G06N 3/08 |
| 2018/0108014 A1 | 4/2018 | Williams | |
| 2018/0113934 A1 | 4/2018 | Jablonski | |
| 2018/0121419 A1 | 5/2018 | Lee | |
| 2018/0144042 A1* | 5/2018 | Sheng | G06F 40/174 |
| 2018/0232361 A1 | 8/2018 | Schick | |
| 2018/0308003 A1 | 10/2018 | Singh | |
| 2018/0329883 A1 | 11/2018 | Leidner | |
| 2018/0357800 A1 | 12/2018 | Oxholm | |
| 2019/0005707 A1 | 1/2019 | Yamada | |
| 2019/0034416 A1 | 1/2019 | Al Hasan | |

(56) References Cited

U.S. PATENT DOCUMENTS

| | | | |
|---|---|---|---|
| 2019/0332674 A1 | 10/2019 | Schick | |
| 2019/0377780 A1* | 12/2019 | Carey | G06F 40/279 |
| 2020/0151393 A1 | 5/2020 | Schick | |
| 2020/0184585 A1* | 6/2020 | Shirasaka | G06Q 50/184 |
| 2020/0210442 A1* | 7/2020 | Bergeron | G06F 40/20 |
| 2020/0210603 A1 | 7/2020 | Schick | |
| 2020/0234000 A1 | 7/2020 | Schick | |
| 2020/0272692 A1* | 8/2020 | Maan | G06F 40/30 |
| 2021/0232759 A1* | 7/2021 | Schick | G06F 40/166 |
| 2022/0075962 A1* | 3/2022 | Kovarik | G06F 40/186 |

OTHER PUBLICATIONS

S. H. H. Ding, B. C. M. Fung, F. Iqbal and W. K. Cheung, "Learning Stylometric Representations for Authorship Analysis," in IEEE Transactions on Cybernetics, vol. 49, No. 1, pp. 107-121, Jan. 2019 (Year: 2019).

Akihiro Shinmori et al: "Patent claim processing for readability", Patent Corpus Processing, Association for Computational Linguistics, N. Eight Street, Stroudsburg, PA, 18360 07960-1961, USA, Jul. 12, 2003 (Jul. 12, 2003), pp. 56-65, XP058144498, DOI: 10.3115/1119303.1119310, abstract, Sections 1-3.

International Search Report and Written Opinion, PCT Application No. PCT/US2018/018257, dated May 17, 2018, 15 pages.

Nadjet Bouayad-Agha et al: "Improving the comprehension of legal documentation", Artificial Intelligence and Law, ACM, 2, Penn Plaza, Suite 701 New York NY, 10121-0701 USA, Jun. 8, 2009 (Jun. 8, 2009), pp. 78-87, XP058361680, DOI: 10.1145/1568234.1568244; ISBN: 978-1-60558-597-0 abstract Sections 2-4; figures 1, 2.

Svetlana Sheremetyeva: "Natural language analysis of patent claims", Patent Corpus Processing, Association for Computational Linguistics, N. Eight Street, Stroudsburg, PA, 18360 07960-1961, USA, Jul. 12, 2003 (Jul. 12, 2003), pp. 66-73, XP058144499, DOI: 10.3115/1119303.1119311, abstract, Sections 1-4.

Tseng, Y. H., Lin, C. J., & Lin, Y. I. (2007). Text mining techniques for patent analysis. Information Processing & Management, 43(5), 1216-1247.

Marinica, C., & Guillet, F. (2010). Knowledge-based interactive postmining of association rules using ontologies. IEEE Transactions on knowledge and data engineering, 22(6), 784-797 (Year: 2010).

* cited by examiner

SYSTEMS AND METHODS FOR EXTRACTING PATENT DOCUMENT TEMPLATES FROM A PATENT CORPUS

CROSS REFERENCE TO RELATED APPLICATIONS

This application is related to U.S. Nonprovisional application Ser. No. 15/892,679, filed Feb. 9, 2018 and entitled "SYSTEMS AND METHODS FOR USING MACHINE LEARNING AND RULES-BASED ALGORITHMS TO CREATE A PATENT SPECIFICATION BASED ON HUMAN-PROVIDED PATENT CLAIMS SUCH THAT THE PATENT SPECIFICATION IS CREATED WITHOUT HUMAN INTERVENTION," now U.S. Pat. No. 10,417,314 issued Sep. 17, 2019; U.S. Nonprovisional application Ser. No. 15/936,239, filed Mar. 26, 2018 and entitled "SYSTEMS AND METHODS FOR FACILITATING EDITING OF A CONFIDENTIAL DOCUMENT BY A NON-PRIVILEGED PERSON BY STRIPPING AWAY CONTENT AND MEANING FROM THE DOCUMENT WITHOUT HUMAN INTERVENTION SUCH THAT ONLY STRUCTURAL AND/OR GRAMMATICAL INFORMATION OF THE DOCUMENT ARE CONVEY," now U.S. Pat. No. 10,621,371 issued Apr. 14, 2020; U.S. Nonprovisional application Ser. No. 15/994,756, filed May 31, 2018 and entitled "MACHINE LEARNING MODEL FOR COMPUTER-GENERATED PATENT APPLICATIONS TO PROVIDE SUPPORT FOR INDIVIDUAL CLAIM FEATURES IN A SPECIFICATION," now U.S. Pat. No. 10,713,443 issued Jul. 14, 2020; U.S. Nonprovisional application Ser. No. 16/025,687, filed Jul. 2, 2018 and entitled "SYSTEMS AND METHODS FOR AUTOMATICALLY CREATING A PATENT APPLICATION BASED ON A CLAIM SET SUCH THAT THE PATENT APPLICATION FOLLOWS A DOCUMENT PLAN INFERRED FROM AN EXAMPLE DOCUMENT," now U.S. Pat. No. 10,747,953 issued Aug. 18, 2020; and U.S. Nonprovisional application Ser. No. 16/025,720, filed Jul. 2, 2018 and entitled "SYSTEMS AND METHODS FOR IDENTIFYING FEATURES IN PATENT CLAIMS THAT EXIST IN THE PRIOR ART," now abandoned, all of which are hereby incorporated by reference in their entireties.

FIELD OF THE DISCLOSURE

The present disclosure relates to systems, methods, and storage media for extracting patent document templates from a patent corpus. The ideas and techniques contemplated herein may be equally applicable to other types documents besides patent documents.

BACKGROUND

Conventionally, patent documents such as patent applications are prepared by patent practitioners licensed to practice before their local patent office. Patent practitioners typically start their patent application preparation projects with a patent application template. The patent application template used for any given patent application preparation project may be generic and applicable to a wide range of innovation domains or it may be specific to a particular patent assignee, innovation domain, field of use, or other specific area. Patent application templates are usually maintained by individual patent practitioners or groups of patent practitioners within a law firm or in-house patent department. A given patent application template may embody a preferred document format and layout. The given patent application template may include boilerplate language and stock descriptions and term definitions. At the outset of a patent application preparation project, a patent practitioner may often select an appropriate patent application template and then populate it with freshly drafted content to yield a ready-to-file document.

SUMMARY

Exemplary implementations disclosed herein include various technologies and techniques for extracting patent document templates from a patent corpus. Patent assignees occasionally change and/or add new outside patent counsel to prepare and file the assignees' patent applications. For a variety of reasons, however, it may be desirable for patent assignees to have consistent work product across their patent portfolio. As such, new outside patent counsel may be challenged to emulate prior law firms' work product.

Implementations described herein address these and other problems by extracting patent document templates from a corpus of patent documents such as published patents and published patent applications. The extracted patent document templates may include patent application templates, office action response templates, appeal brief templates, and/or other templates of other documents within the corpus of patent documents. In addition, some implementations may address ways to perform such extraction in an efficient manner by eliminating the need for full-text comparisons of each pair of patent documents in the corpus.

One aspect of the present disclosure relates to a method for extracting patent document templates from a patent corpus. The method may include obtaining a patent corpus. The patent corpus may include a plurality of patent documents. The method may include receiving one or more parameters. The one or more parameters may include a first parameter. The method may include determining one or more subsets of the patent corpus by filtering the patent corpus based on the one or more parameters. The one or more subsets of the patent corpus may include a first subset of the patent corpus. The method may include identifying one or more document clusters within individual ones of the one or more subsets of the patent corpus. The one or more document clusters may include a first document cluster within the first subset of the patent corpus. A given one of the one or more document clusters may include a plurality of patent documents sharing common text. The method may include identifying one or more document clusters within individual ones of the one or more subsets of the patent corpus. The one or more document clusters may include a first document cluster within the first subset of the patent corpus. A given one of the one or more document clusters may include a plurality of patent documents sharing common text. The method may include obtaining a patent document template corresponding to the first document cluster. The patent document template may include common text shared by the patent documents of the first document cluster.

In some implementations of the method, individual ones of the plurality of patent documents may include one or both of published patents or published patent applications.

In some implementations of the method, the plurality of patent documents may correspond to a specific patent jurisdiction.

In some implementations of the method, the patent corpus may be provided by a patent office.

In some implementations of the method, the plurality of patent documents may correspond to a publication date range.

In some implementations of the method, the patent corpus may be in the public domain.

In some implementations of the method, the patent documents may be in an electronic form.

In some implementations of the method, the patent documents may be stored in a database.

In some implementations of the method, a given one of the one or more parameters may include one or more of a patent assignee, a name of a competitor of a patent assignee, an inventor name, a name of a law firm that prepared a corresponding patent application, a name of an attorney who prepared a corresponding patent application, a name of a law firm that filed a corresponding patent application, a name of an attorney who filed a corresponding patent application, a name of a law firm handling prosecution of a corresponding patent application, a name of an attorney prosecuting a corresponding patent application, an examiner associated with examination of a corresponding patent application, a patent application filing date, a patent application filing date range, a patent application publication date, a patent application publication date range, a patent issuance date, a patent issuance date range, a patent classification, a range of patent classifications, an identifier of a cited prior art reference corresponding to a patent application, and/or other parameters.

In some implementations of the method, the first subset of the patent corpus may include a plurality of subset documents. In some implementations of the method, the plurality of subset documents may include patent documents associated with a specific patent assignee and a specific law firm responsible for filing underlying patent applications associated with the plurality of subset documents.

In some implementations of the method, sharing common text may include multiple patent documents having spans of similar or identical text. In some implementations of the method, the spans of similar or identical text may include a first span.

In some implementations of the method, the first span may include one or more of a sentence, a paragraph, a group of adjacent paragraphs, and/or other spans.

In some implementations of the method, the common text may include one or more of boilerplate language, a stock description, a stock description of a stock drawing figure, a stock definition, and/or other text.

In some implementations of the method, identifying the one or more document clusters may include comparing some or all combinations of pairs of patent documents contained in a given subset of the patent corpus.

In some implementations of the method, comparing some or all combinations of pairs of patent documents contained in a given subset of the patent corpus may include comparing spans of text at specific locations in individual pairs of patent documents.

In some implementations of the method, the specific locations may include locations where related patent documents frequently share common text.

In some implementations of the method, the specific locations may include one or more of a first portion of a summary section, a last portion of a summary section, a first portion of a brief description of drawing section, a last portion of a brief description of drawings section, a first portion of a detailed description section, a last portion of a detailed description section, and/or other portions.

In some implementations of the method, identifying the one or more document clusters may include encoding spans such that individual spans are represented by unique encodings.

In some implementations of the method, encoding spans may include applying one or more of a hash function, character encoding, and/or semantics encoding to individual spans.

In some implementations of the method, the unique encodings enable rapid comparison between patent documents contained in a given document cluster.

In some implementations of the method, the patent document template may be a basis for a new patent application.

Another aspect of the present disclosure relates to a system configured for extracting patent document templates from a patent corpus. The system may include one or more hardware processors configured by machine-readable instructions. The processor(s) may be configured to obtain a patent corpus. The patent corpus may include a plurality of patent documents. The processor(s) may be configured to receive one or more parameters. The one or more parameters may include a first parameter. The processor(s) may be configured to determine one or more subsets of the patent corpus by filtering the patent corpus based on the one or more parameters. The one or more subsets of the patent corpus may include a first subset of the patent corpus. The processor(s) may be configured to identify one or more document clusters within individual ones of the one or more subsets of the patent corpus. The one or more document clusters may include a first document cluster within the first subset of the patent corpus. A given one of the one or more document clusters may include a plurality of patent documents sharing common text. The processor(s) may be configured to identify one or more document clusters within individual ones of the one or more subsets of the patent corpus. The one or more document clusters may include a first document cluster within the first subset of the patent corpus. A given one of the one or more document clusters may include a plurality of patent documents sharing common text. The processor(s) may be configured to obtain a patent document template corresponding to the first document cluster. The patent document template may include common text shared by the patent documents of the first document cluster.

Yet another aspect of the present disclosure relates to a non-transient computer-readable storage medium having instructions embodied thereon, the instructions being executable by one or more processors to perform a method for extracting patent document templates from a patent corpus. The method may include obtaining a patent corpus. The patent corpus may include a plurality of patent documents. The method may include receiving one or more parameters. The one or more parameters may include a first parameter. The method may include determining one or more subsets of the patent corpus by filtering the patent corpus based on the one or more parameters. The one or more subsets of the patent corpus may include a first subset of the patent corpus. The method may include identifying one or more document clusters within individual ones of the one or more subsets of the patent corpus. The one or more document clusters may include a first document cluster within the first subset of the patent corpus. A given one of the one or more document clusters may include a plurality of patent documents sharing common text. The method may include identifying one or more document clusters within individual ones of the one or more subsets of the patent corpus. The one or more document clusters may include a first document cluster within the first subset of the patent corpus. A given one of the one or more document clusters may include a plurality of patent documents sharing common text. The method may include obtaining a patent document template corresponding to the first document cluster. The patent document template may include common text shared by the patent documents of the first document cluster.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
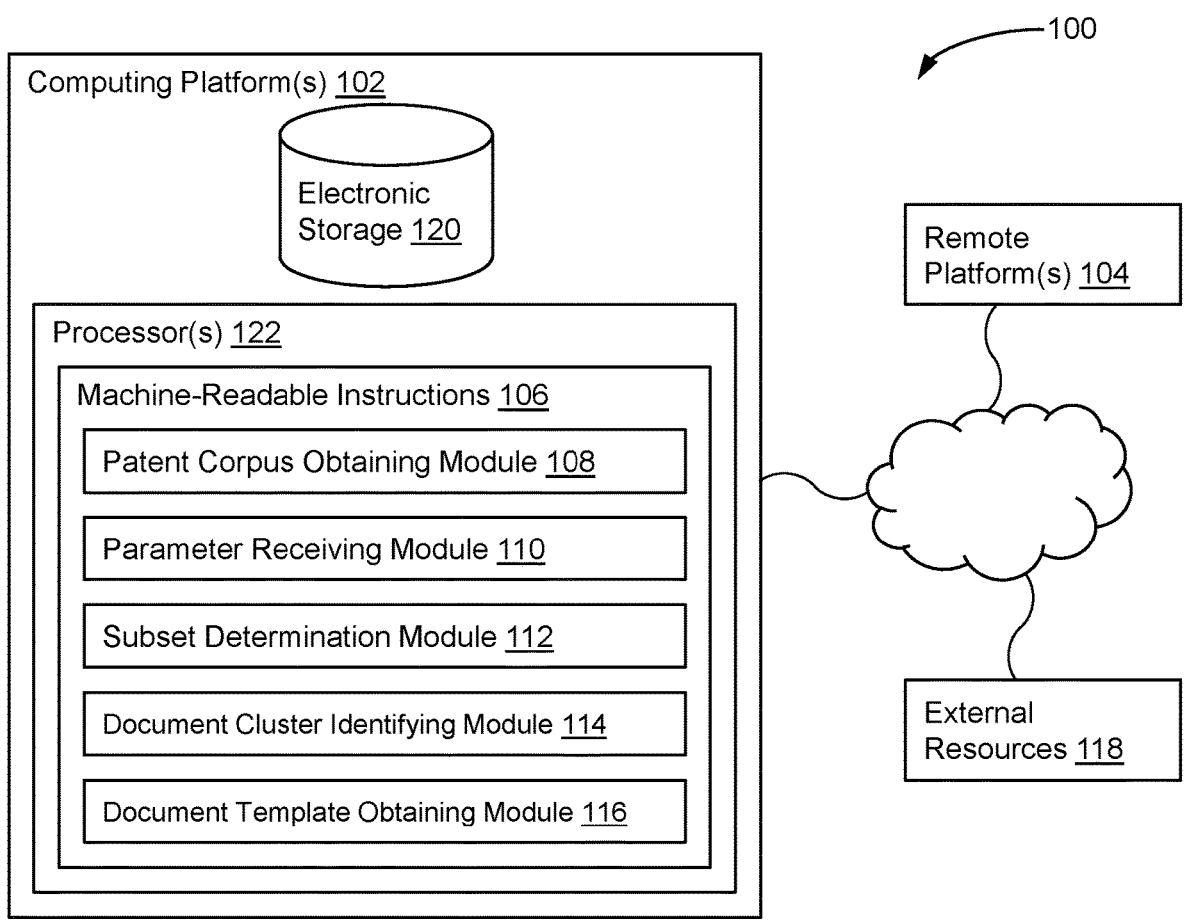
FIG. 1 illustrates a system configured for extracting patent document templates from a patent corpus, in accordance with one or more implementations.

Systems, methods, and storage media for extracting patent document templates from a patent corpus are disclosed. Exemplary implementations may: obtain a patent corpus; receive one or more parameters; determine one or more subsets of the patent corpus by filtering the patent corpus based on the one or more parameters; identify one or more document clusters within individual ones of the one or more subsets of the patent corpus; identify one or more document clusters within individual ones of the one or more subsets of the patent corpus; obtain a patent document template corresponding to the first document cluster; and/or perform other operations.

A patent application may have a plurality of parts including one or more of claims, specification, figures, and/or other parts. The claims are a numbered list of sentences that precisely define what is being asserted as the invention. In other words, the claims attempt to define the boundary between what is regarded as prior art and what is considered as inventive (i.e., useful, new, and non-obvious). The specification may be the longest section. It explains how to make and use the claimed invention. Finally, the figures complement the specification and depict the claimed features.

A claim set may be prepared by a human, a machine, and/or a human and machine working in concert. The claim set may include a numbered list of sentences that precisely define an invention. The claim set may include an independent claim and one or more dependent claims. Each dependent claim in the claim set may depend on the independent claim by referring to the independent claim or an intervening dependent claim.

A claim line may be a unit of text having an end indicated by a presence of one or more end-of-claim line characters. By way of non-limiting example, the one or more end-of-claim line characters may include one or more of a colon, a semi-colon, a carriage return, and/or other characters.

One or more claims and/or parts of a claim may be represented by a data structure. A given data structure may include a specialized format for organizing and storing data. In some implementations, by way of non-limiting example, the data structure may include one or more of an array, a list, two or more linked lists, a stack, a queue, a graph, a table, a tree, and/or other structures.

A claim may include one or more language elements. By way of non-limiting example, a language element may include one or more of a word, a phrase, a clause, and/or a sentence. A claim may be a single sentence. By way of non-limiting example, a sentence may include a set of words that is complete and contains a subject and predicate, a sentence including a main clause and optionally one or more subordinate clauses. By way of non-limiting example, a clause may include a unit of grammatical organization next below a sentence, a clause including a subject and predicate. A phrase may include a small group of words standing together as a conceptual unit, a phrase forming a component of a clause. By way of non-limiting example, a word may include a single distinct meaningful element of language used with others to form a sentence, a word being shown with a space on either side when written or printed.

A claim may include one or more language units. The one or more language units may be in patentese. The patentese may include text structure and legal jargon commonly used in patent claims.

The language units may be organized in a data structure according to one or more classifications of individual language elements. By way of non-limiting example, the one or more classifications may include one or more of independent claim, dependent claim, preamble, main feature, sub feature, claim line, clause, phrase, and/or word. A preamble of an independent claim preamble may convey a general description of the invention as a whole. A preamble of a dependent claim may include a reference to a preceding claim. In some implementations, a given main feature may include a step of a claimed process or a structural element of a non-method claim. In some implementations, a given sub feature may correspond to a given main feature. In some implementations, a given sub feature may describe or expand on an aspect of a corresponding main feature.

The specification of a patent application may include language units. One or more language units in the specification may be in prose rather than patentese. In some implementations, prose may include an ordinary form of written language, without structure of claim language, as distinguished from patentese. The prose may include permissive prose. In some implementations, the permissive prose may convey allowed but not obligatory concepts.

Some implementations may be configured to perform a natural language processing operation and/or natural language generation operation on data structures and/or contents of data structures. The natural language processing operation and/or natural language generation operation may be based on a machine learning model. By way of non-limiting example, the machine learning model may be based on one or more of a supervised learning algorithm, an unsupervised learning algorithm, a semi-supervised learning algorithm, a regression algorithm, an instance-based algorithm, a regularized algorithm, a decision tree algorithm, a Bayesian algorithm, a clustering algorithm, an association rule learning algorithm, an artificial neural network algorithm, a deep learning algorithm, a dimensionality reduction algorithm, an ensemble algorithm, and/or other information. In some implementations, by way of non-limiting example, the machine learning system may include one or more of a sequence-to-sequence transformation, a recurrent neural network, a convolutional neural network, a finite-state transducer, hidden Markov models, and/or other systems.

By way of non-limiting example, the natural language generation operation may include one or more of paraphrase induction, simplification, compression, clause fusion, expansion, and/or other operations. Paraphrase induction may include preserving original meaning. By way of non-limiting example, paraphrase induction may include rewording and/or rearranging one or more of phrases, clauses, claim lines, entire claims, and/or other content. Simplification may include preserving original meaning. Simplification may include splitting up a claim line for readability. Compression may include preserving important aspects. Compression may include deleting content for summarization. Fusion may include preserving important aspects. Fusion may include combining language elements for summarization. Expansion may include preserving original meaning and embellishing on the original content. Expansion may include introducing new content that supports or broadens the original meaning. Sentence semantics may be lossless with paraphrasing and simplification. Sentence semantics may be lossy with compression and fusion.

A one-to-one language element transformation may occur with paraphrasing and compression. A one-to-many language element transformation may occur with simplification. A many-to-one language element transformation may occur with fusion. The natural language generation operation may be performed according to a set of rules.

FIG. 1 illustrates a system 100 configured for extracting patent document templates from a patent corpus, in accordance with one or more implementations. In some implementations, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of patent corpus obtaining module 108, parameter receiving module 110, subset determination module 112, document cluster identifying module 114, document template obtaining module 116, and/or other instruction modules.

Patent corpus obtaining module 108 may be configured to obtain a patent corpus. The patent corpus may be provided by a patent office. The patent office may be the United States Patent and Trademark Office (USPTO). The patent corpus may be in the public domain. According to the USPTO, "Subject to limited exceptions reflected in 37 CFR 1.71 (d) & (e) and 1.84(s), the text and drawings of a patent are typically not subject to copyright restrictions". The patent corpus may include a plurality of patent documents. Individual ones of the plurality of patent documents may include one or more of published patents, published patent applications, office action response, appeal briefs, and/or other patent documents.

Parameter receiving module 110 may be configured to receive one or more parameters. By way of non-limiting example, a given one of the one or more parameters may include one or more of a patent assignee, a name of a competitor of a patent assignee, an inventor name, a name of a law firm that prepared a corresponding patent application, a name of an attorney who prepared a corresponding patent application, a name of a law firm that filed a corresponding patent application, a name of an attorney who filed a corresponding patent application, a name of a law firm handling prosecution of a corresponding patent application, a name of an attorney prosecuting a corresponding patent application, an examiner associated with examination of a corresponding patent application, a patent application filing date, a patent application filing date range, a patent application publication date, a patent application publication date range, a patent issuance date, a patent issuance date range, a patent classification, a range of patent classifications, an identifier of a cited prior art reference corresponding to a patent application, and/or other parameters. The one or more parameters may include a first parameter, a second parameter, and/or other parameters.

Subset determination module 112 may be configured to determine one or more subsets of the patent corpus by filtering the patent corpus based on the one or more parameters. The patent corpus may include millions of patent documents. For example, over 10 million patents have been issued by the USPTO. Reducing the number of documents being analyzed may make template extraction more feasible from a compute time perspective. The one or more subsets of the patent corpus may include a first subset of the patent corpus. The first subset of the patent corpus may be determined based on the first parameter, a second parameter, and/or other parameters. The first subset of the patent corpus may include a plurality of subset documents. In some implementations, the plurality of subset documents may include patent documents associated with a specific patent assignee and a specific law firm responsible for filing underlying patent applications associated with the plurality of subset documents. For example, the first subset of the patent corpus may include all published patents (1) owned by "Assignee A", (2) prepared and filed by "Law Firm B", and (3) classified within "Patent Classification Range C" (see, e.g., FIG. 3).

Document cluster identifying module 114 may be configured to identify one or more document clusters within individual ones of the one or more subsets of the patent corpus. A document cluster may be a group of documents. The one or more document clusters may include a first document cluster within the first subset of the patent corpus. A given one of the one or more document clusters may include a plurality of patent documents sharing common text. By way of non-limiting example, the common text may include one or more of boilerplate language, a stock description, a stock description of a stock drawing figure, a stock definition, and/or other text.

In some implementations, sharing common text may include multiple patent documents having spans of similar or identical text.

A similarity between spans may be determined based on breaching a threshold of one or more of shared words between two spans, shared n-grams between two spans, a shared encoding between two spans, a shared character length among two spans, a same size in memory among two spans, and/or other measures of similarity. In some implementations, the spans of similar or identical text may include a first span. In some implementations, by way of non-limiting example, the first span may include one or more of a sentence, a paragraph, a group of adjacent paragraphs, and/or other spans.

Identifying the one or more document clusters may include comparing some or all combinations of pairs of patent documents contained in a given subset of the patent corpus. Comparing some or all combinations of pairs of patent documents contained in a given subset of the patent corpus may include comparing spans of text at specific locations in individual pairs of patent documents. The specific locations may include locations where related patent documents frequently share common text. By way of non-limiting example, the specific locations may include one or more of a first portion of a Summary section, a last portion of a Summary section, a first portion of a Brief Description of Drawings section, a last portion of a brief description of Drawings section, a first portion of a Detailed Description section, a last portion of a Detailed Description section, and/or other locations (see FIG. 4).

According to some implementations, clustering of patent documents within a subset of the patent corpus may be performed in an iterative manner and/or a dynamic manner. Cluster identification may be based on the specific locations of common text in the patent documents. Cluster identification may be based on quantity of common text at specific locations in the patent documents. In some implementations, some or all numeral characters may be removed from the patent documents prior to identifying common text.

Identifying the one or more document clusters may include encoding spans such that individual spans are represented by unique encodings. A given encoding may include a specific code, such as letters, symbols, and/or numbers, applied to data for conversion into an equivalent cipher. An encoded span may be represented by a unique number, a unique alphanumeric string, and/or other encoding. By way of non-limiting example, encoding spans may include applying one or more of a hash function, character encoding, semantics encoding to individual spans, and/or other techniques. The unique encodings enable rapid comparison between patent documents contained in a given document cluster. The one or more document clusters may include a first document cluster within the first subset of the patent corpus. A given one of the one or more document clusters may include a plurality of patent documents sharing common text.

The plurality of patent documents may correspond to a specific patent jurisdiction. The plurality of patent documents may correspond to a publication date range. The patent documents may be in an electronic form. By way of non-limiting example, the electronic form may include one or more of a portable document format, a plain text format, a mark-up language format, a data interchange format, a human-readable format, and/or other forms. The patent documents may be stored in a database.

Document template obtaining module 116 may be configured to obtain a patent document template corresponding to the first document cluster. The patent document template may include common text shared by the patent documents of the first document cluster. In some implementations, the patent document template may be a basis for a new patent application.

By way of non-limiting example, the patent document template may embody the preference of a patent assignee and/or a patent practitioner with respect to document layout and templated language. Templated language may include any text that is reused among multiple patent applications. The templated language may include one or more of words, phrases, parts of sentences, sentences, boilerplate paragraphs, common descriptions of stock drawing figures, common term definitions, and/or other reusable language.

In some implementations, computing platform(s) 102, remote platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 118 may be operatively linked via some other communication media.

A given remote platform 104 may include one or more processors configured to execute computer program modules. The computer program modules may be configured to enable an expert or user associated with the given remote platform 104 to interface with system 100 and/or external resources 118, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, and/or other computing platforms.

External resources 118 may include sources of information outside of system 100, external entities participating with system 100, and/or other resources. In some implementations, some or all of the functionality attributed herein to external resources 118 may be provided by resources included in system 100.

Computing platform(s) 102 may include electronic storage 120, one or more processors 122, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 120 may comprise non-transitory storage media that electronically stores information. The electronic storage media of electronic storage 120 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from computing platform(s) 102, information received from remote platform(s) 104, and/or other information that enables computing platform(s) 102 to function as described herein.

Processor(s) 122 may be configured to provide information processing capabilities in computing platform(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute modules 108, 110, 112, 114, and/or 116, and/or other modules. Processor(s) 122 may be configured to execute modules 108, 110, 112, 114, and/or 116, and/or other modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, and/or 116 are illustrated in FIG. 1 as being implemented within a single processing unit, in implementations in which processor(s) 122 includes multiple processing units, one or more of modules 108, 110, 112, 114, and/or 116 may be implemented remotely from the other modules. The description of the functionality provided by the different modules 108, 110, 112, 114, and/or 116 described below is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As another example, processor(s) 122 may be configured to execute one or more additional modules that may perform some or all of the functionality attributed below to one of modules 108, 110, 112, 114, and/or 116.

Figure 2:
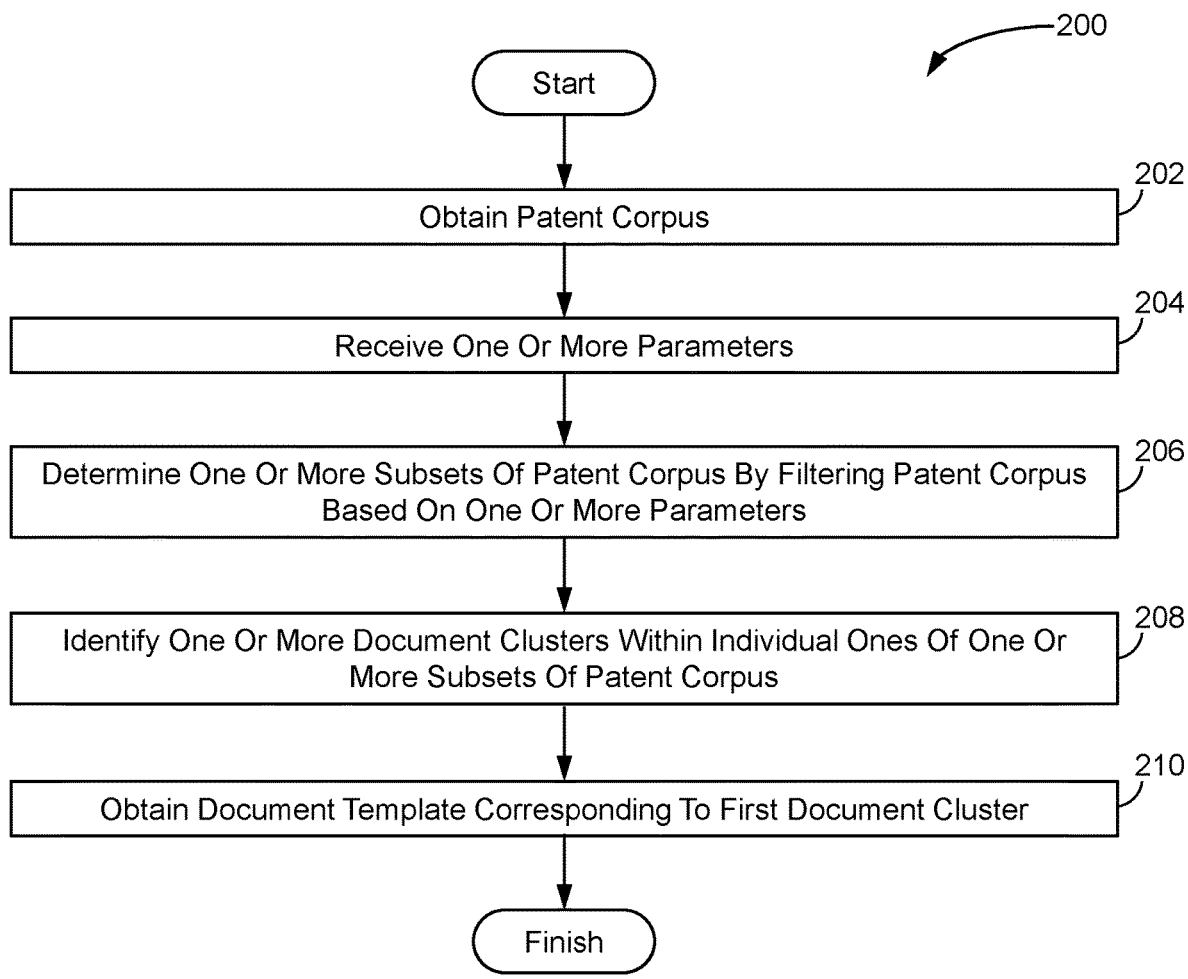
FIG. 2 illustrates a method for extracting patent document templates from a patent corpus, in accordance with one or more implementations.

FIG. 2 illustrates a method 200 for extracting patent document templates from a patent corpus, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining a patent corpus. The patent corpus may include a plurality of patent documents. Operation 202 may be performed by one or more hardware processors configured by machine-readable instructions including a module that is the same as or similar to patent corpus obtaining module 108, in accordance with one or more implementations.

An operation 204 may include receiving one or more parameters. The one or more parameters may include a first parameter. Operation 204 may be performed by one or more hardware processors configured by machine-readable instructions including a module that is the same as or similar to parameter receiving module 110, in accordance with one or more implementations.

An operation 206 may include determining one or more subsets of the patent corpus by filtering the patent corpus based on the one or more parameters. The one or more subsets of the patent corpus may include a first subset of the patent corpus. Operation 206 may be performed by one or more hardware processors configured by machine-readable instructions including a module that is the same as or similar to subset determination module 112, in accordance with one or more implementations.

An operation 208 may include identifying one or more document clusters within individual ones of the one or more subsets of the patent corpus. The one or more document clusters may include a first document cluster within the first subset of the patent corpus. A given one of the one or more document clusters may include a plurality of patent documents sharing common text. Operation 208 may be performed by one or more hardware processors configured by machine-readable instructions including a module that is the same as or similar to document cluster identifying module 114, in accordance with one or more implementations.

An operation 210 may include obtaining a patent document template corresponding to the first document cluster. The patent document template may include common text shared by the patent documents of the first document cluster. Operation 210 may be performed by one or more hardware processors configured by machine-readable instructions including a module that is the same as or similar to document template obtaining module 116, in accordance with one or more implementations.

Figure 3:
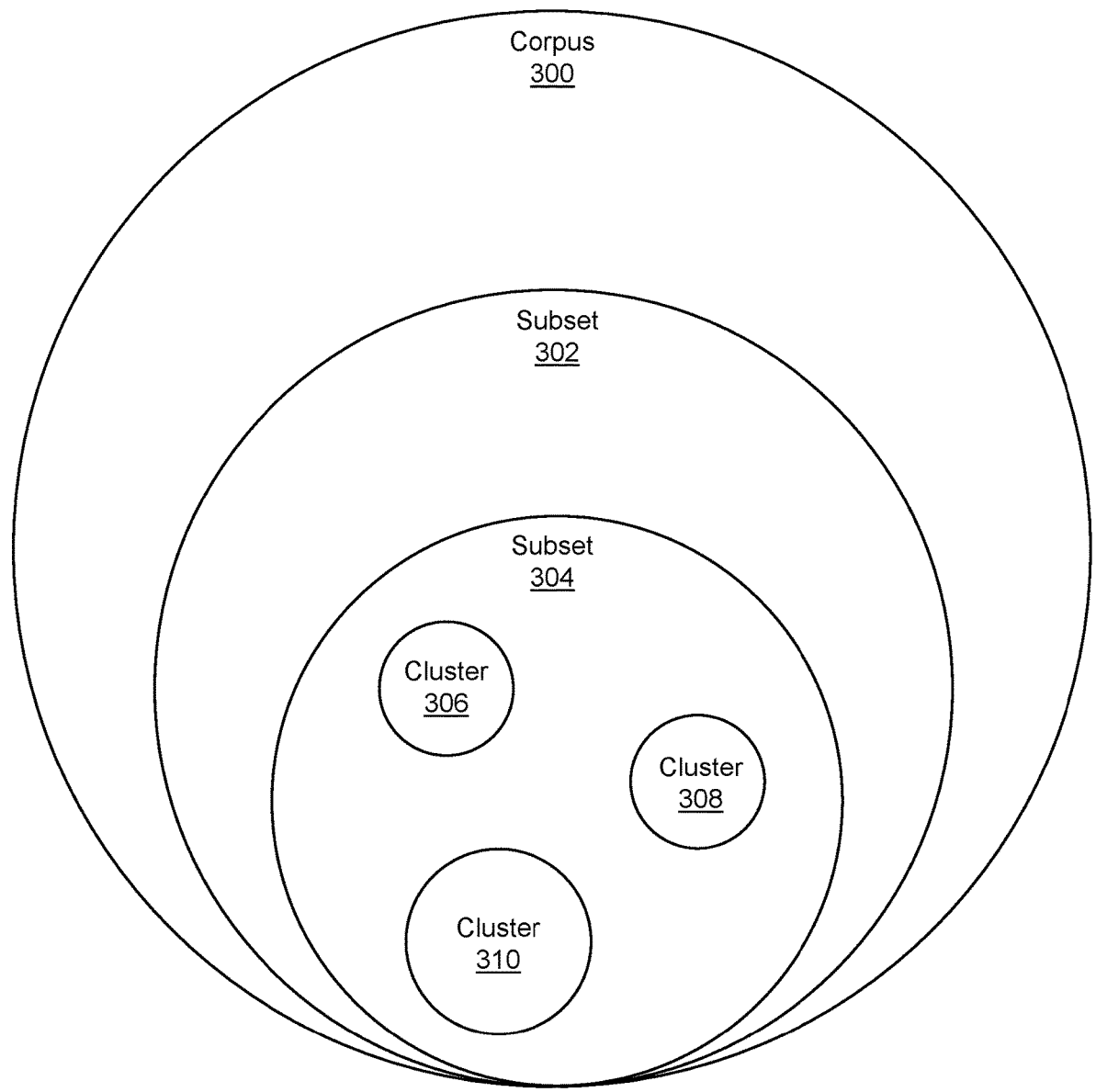
FIG. 3 illustrates an exemplary corpus in the context of patent document template extraction, in accordance with one or more implementations.

FIG. 3 illustrates an exemplary corpus 300 in the context of patent document template extraction, in accordance with one or more implementations. Corpus 300 may include patent documents (potentially numbering in the millions). Corpus 300 may include subset 302 of patent documents (potentially numbering in the tens of thousands). In one implementation, subset 302 includes patent documents owned by "Assignee A". Subset 302 may include subset 304 of patent documents (potentially numbering in the thousands). In one implementation, subset 304 includes patent documents drafted and filed by "Law Firm B" on behalf of "Assignee A". Subset 304 may include one or more document clusters. As illustrated, subset 304 includes cluster 306, cluster 308, and cluster 310. Individual clusters include patent documents that where prepared based on the same or similar patent document template.

Figure 4:
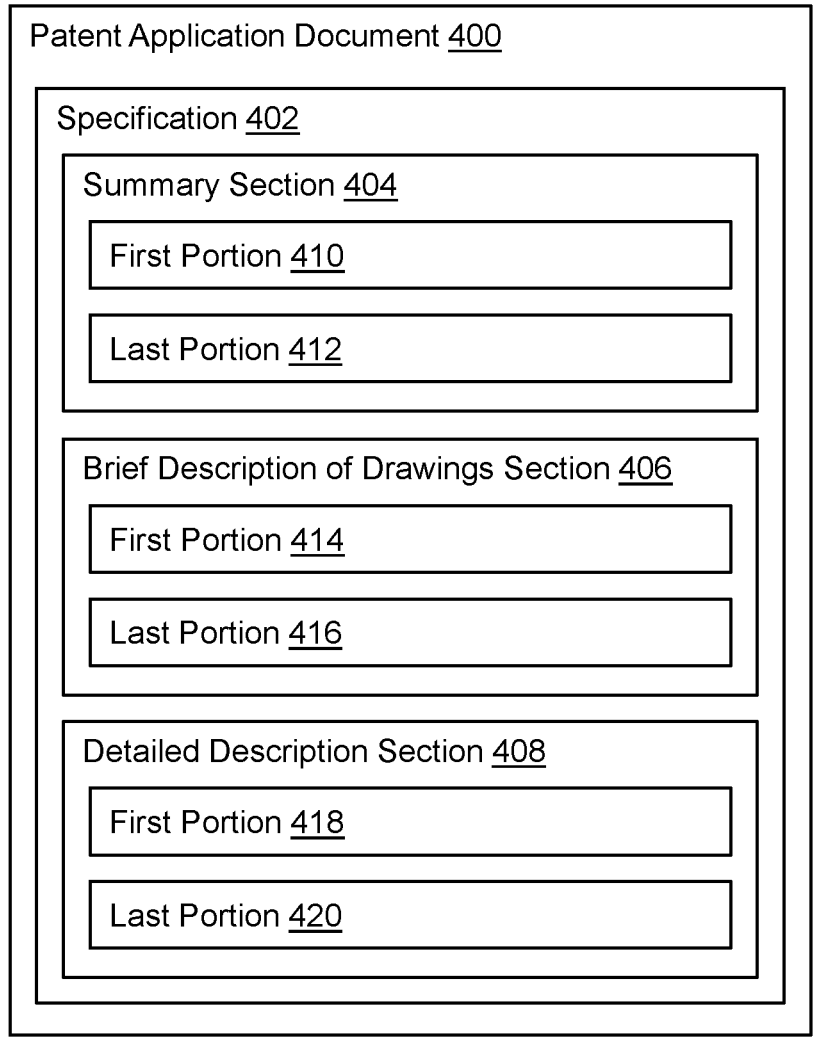
FIG. 4 illustrates an exemplary patent application document with document sections and different analysis locations identified, in accordance with one or more implementations.

FIG. 4 illustrates an exemplary patent application document 400 with document sections and different analysis locations identified, in accordance with one or more implementations. Patent application document 400 may include specification 402. To identify pairs and/or clusters of patent applications that were prepared based on the same or similar patent document template, specific locations of specification 402 may be analyzed, in accordance with some implementations. The specific portions may include portions where practitioners generally place reused language, such as at the beginning and/or ending of certain sections.

Specification 402 may include one or more sections including one or more of a summary section 404, a brief description of drawings section 406, a detailed description section 408, and/or other sections. Summary section 404 may include a first portion 410, a last portion 412, and/or other portions. Brief description of drawings section 406 may include a first portion 414, a last portion 416, and/or other portions. Detailed description section 408 may include a first portion 418, a last portion 420, and/or other portions. Two patent applications were likely prepared based on a common patent document template if the two patent applications share common text at one or more of first portion 410, last portion 412, first portion 414, last portion 416, first portion 418, last portion 420, and/or other portions. Comparing full text may be computationally impractical. As such, the portions, 410, 412, 414, 416, 418, and/or 420 may be encoded to facilitate rapid comparisons between pairs of patent documents. In some implementations, computation time during clustering may be improved from years to minutes by encoding entire sentences and/or entire paragraphs included in portions 410, 412, 414, 416, 418, and/or 420.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for extracting patent document templates from a patent corpus, the method comprising:
    obtaining a patent corpus, the patent corpus including a plurality of patent documents;
    receiving one or more parameters, the one or more parameters including a first parameter;
    determining one or more subsets of the patent corpus by filtering the patent corpus based on the one or more parameters, the one or more subsets of the patent corpus including a first subset of the patent corpus;
    identifying one or more document clusters within individual ones of the one or more subsets of the patent corpus, the one or more document clusters including a first document cluster within the first subset of the patent corpus, wherein the first document cluster includes a plurality of patent documents sharing common text, wherein the identifying the one or more document clusters includes comparing some or all combinations of pairs of patent documents contained in a given subset of the patent corpus, and wherein the comparing the some or all combinations of the pairs of patent documents contained in the given subset of the patent corpus includes:
        identifying one or more specific patent document sections in individual patent documents included in the one or more subsets of the patent corpus where related patent documents frequently share common spans of text, wherein the specific patent document sections include one or more of a first portion of a summary section, a last portion of a summary section, a first portion of a brief description of drawing section, a last portion of a brief description of drawings section, a first portion of a detailed description section, or a last portion of a detailed description section;
        obtaining the spans of text included in the one or more of the specific patent document sections of the individual patent documents included in the one or more subsets of the patent corpus; and
        comparing, for individual ones of the pairs of patent documents, the spans of text obtained from the individual patent documents of the pairs of patent documents to determine if they are common text; and
    obtaining a patent document template corresponding to the first document cluster, the patent document template including the common text of the plurality of patent documents sharing common text.

2. The method of claim 1, wherein the individual patent documents of the plurality of patent documents include one or both of published patents or published patent applications.

3. The method of claim 1, wherein the plurality of patent documents corresponds to a specific patent jurisdiction, wherein the patent corpus is provided by a patent office, and wherein the patent corpus is in a public domain.

4. The method of claim 1, wherein the plurality of patent documents corresponds to a publication date range.

5. The method of claim 1, wherein the individual patent documents are in an electronic form.

6. The method of claim 1, wherein a given one of the one or more parameters include one or more of a patent assignee, a name of a competitor of a patent assignee, an inventor name, a name of a law firm that prepared a corresponding patent application, a name of an attorney who prepared a corresponding patent application, a name of a law firm that filed a corresponding patent application, a name of an attorney who filed a corresponding patent application, a name of a law firm handling prosecution of a corresponding patent application, a name of an attorney prosecuting a corresponding patent application, an examiner associated with examination of a corresponding patent application, a patent application filing date, a patent application filing date range, a patent application publication date, a patent application publication date range, a patent issuance date, a patent issuance date range, a patent classification, a range of patent classifications, or an identifier of a cited prior art reference corresponding to a patent application.

7. The method of claim 1, wherein the first subset of the patent corpus includes a plurality of subset documents, the plurality of subset documents including patent documents associated with a specific patent assignee and a specific law firm responsible for filing underlying patent applications associated with the plurality of subset documents.

8. The method of claim 1, wherein the spans of text are determined to be the common text if they are similar or identical text, wherein the spans of text that are similar or identical include a first span.

9. The method of claim 8, wherein the first span includes one or more of a sentence, a paragraph, or a group of adjacent paragraphs.

10. The method of claim 8, wherein the common text included in the plurality of patent documents sharing common text includes one or more of boilerplate language, a stock description, a stock description of a stock drawing figure, or a stock definition.

11. The method of claim 1, wherein the identifying the one or more document clusters includes encoding spans such that individual spans are represented by unique encodings.

12. The method of claim 11, wherein the encoding the spans includes applying one or more of a hash function, character encoding, or semantics encoding to the individual spans.

13. The method of claim 11, wherein the unique encodings enable rapid comparison between patent documents contained in a given document cluster.

14. The method of claim 1, wherein the patent document template is a basis for a new patent application.

15. The method of claim 1, wherein one or more of the identifying the one or more of the specific patent document sections in the individual patent documents, the obtaining the spans of text included in the one or more of the specific patent document sections, or the comparing the spans of text, are performed using an operation based on a machine learning model.

16. A system configured for extracting patent document templates from a patent corpus, the system comprising:
one or more hardware processors configured by machine-readable instructions to:
obtain a patent corpus, the patent corpus including a plurality of patent documents;
receive one or more parameters, the one or more parameters including a first parameter;
determine one or more subsets of the patent corpus by filtering the patent corpus based on the one or more parameters, the one or more subsets of the patent corpus including a first subset of the patent corpus;
identify one or more document clusters within individual ones of the one or more subsets of the patent corpus, the one or more document clusters including a first document cluster within the first subset of the patent corpus, wherein the first document cluster includes a plurality of patent documents sharing common text, wherein identifying the one or more document clusters includes comparing some or all combinations of pairs of patent documents contained in a given subset of the patent corpus, and wherein comparing the some or all combinations of the pairs of patent documents contained in the given subset of the patent corpus includes:
identifying one or more specific patent document sections in individual patent documents included in the one or more subsets of the patent corpus where related patent documents frequently share common spans of text, wherein the specific patent document sections include one or more of a first portion of a summary section, a last portion of a summary section, a first portion of a brief description of drawing section, a last portion of a brief description of drawings section, a first portion of a detailed description section, or a last portion of a detailed description section;
obtaining the spans of text included in the one or more of the specific patent document sections of the individual patent documents included in the one or more subsets of the patent corpus; and
comparing, for individual ones of the pairs of patent documents, the spans of text obtained from the individual patent documents of the pairs of patent documents to determine if they are common text; and
obtain a patent document template corresponding to the first document cluster, the patent document template including the common text of the plurality of patent documents sharing common text.

17. The system of claim 16, wherein the one or more hardware processors are further configured by to machine-readable instructions to implement an operation based on a machine learning model to identify the one or more of the specific patent document sections in the individual patent documents, obtain the spans of text included in the one or more of the specific patent document sections, and/or compare the spans of text.

18. A non-transient computer-readable storage medium having instructions embodied thereon, the instructions being executable by one or more processors to perform a method for extracting patent document templates from a patent corpus, the method comprising:
obtaining a patent corpus, the patent corpus including a plurality of patent documents;
receiving one or more parameters, the one or more parameters including a first parameter;
determining one or more subsets of the patent corpus by filtering the patent corpus based on the one or more parameters, the one or more subsets of the patent corpus including a first subset of the patent corpus;
identifying one or more document clusters within individual ones of the one or more subsets of the patent corpus, the one or more document clusters including a first document cluster within the first subset of the patent corpus, wherein the first document cluster includes a plurality of patent documents sharing common text, wherein the identifying the one or more document clusters includes comparing some or all combinations of pairs of patent documents contained in a given subset of the patent corpus, and wherein the comparing the some or all combinations of the pairs of patent documents contained in the given subset of the patent corpus includes:
identifying one or more specific patent document sections in individual patent documents included in the one or more subsets of the patent corpus where related patent documents frequently share common spans of text, wherein the specific patent document sections include one or more of a first portion of a summary section, a last portion of a summary section, a first portion of a brief description of drawing section, a last portion of a brief description of drawings section, a first portion of a detailed description section, or a last portion of a detailed description section;
obtaining the spans of text included in the one or more of the specific patent document sections of the individual patent documents included in the one or more subsets of the patent corpus; and
comparing, for individual ones of the pairs of patent documents, the spans of text obtained from the individual patent documents of the pairs of patent documents to determine if they are common text; and obtaining a patent document template corresponding to the first document cluster, the patent document template including the common text of the plurality of patent documents sharing common text.

19. The non-transient computer-readable storage medium of claim 18, wherein one or more of the identifying the one or more of the specific patent document sections in the individual patent documents, the obtaining the spans of text included in the one or more of the specific patent document sections, or the comparing the spans of text, are performed using an operation based on a machine learning model.

* * * * *